(12) United States Patent
Fischer et al.

(10) Patent No.: US 7,669,783 B2
(45) Date of Patent: Mar. 2, 2010

(54) METERING VALVE WITH A HYDRAULIC TRANSMISSION ELEMENT

(75) Inventors: Bernhard Fischer, Toeging A. Inn (DE); Bernhard Gottlieb, München (DE); Andreas Kappel, Brunnthal (DE); Hans Meixner, Haar (DE); Randolf Mock, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/364,158

(22) Filed: Feb. 11, 2003

(65) Prior Publication Data

US 2003/0127615 A1 Jul. 10, 2003

Related U.S. Application Data

(63) Continuation of application No. PCT/DE01/03042, filed on Aug. 9, 2001.

(30) Foreign Application Priority Data

Aug. 11, 2000 (DE) ................................ 100 39 424

(51) Int. Cl.
*B05B 1/08* (2006.01)
(52) U.S. Cl. ..................... 239/102.2; 239/456; 239/584; 251/57
(58) Field of Classification Search ............... 239/102.1, 239/102.2, 456, 459, 541, 583, 584; 251/57
See application file for complete search history.

(56) References Cited

U.S. PATENT DOCUMENTS

| 4,278,233 | A | * | 7/1981 | Zurner et al. ................ 251/57 |
| 4,491,296 | A | * | 1/1985 | Frank ........................... 251/14 |
| 4,858,439 | A | | 8/1989 | Sawada et al. ................ 60/583 |
| 5,697,554 | A | | 12/1997 | Auwaerter et al. ............ 239/88 |
| 6,062,532 | A | | 5/2000 | Gurich et al. ................. 251/57 |

FOREIGN PATENT DOCUMENTS

| DE | 38 44 134 A1 | 7/1989 |
| DE | 197 44 235 A1 | 4/1999 |
| DE | 19843570 A1 * | 3/2000 |
| DE | 198 39 125 C1 | 4/2000 |
| DE | 198 56 185 A1 | 6/2000 |
| DE | 198 56 186 A1 | 6/2000 |
| DE | 198 56 201 A1 | 6/2000 |
| DE | 198 56 202 A1 | 6/2000 |
| EP | 1 046 809 A2 | 4/2000 |
| WO | 02/14683 | 2/2002 |

* cited by examiner

*Primary Examiner*—Christopher S Kim
(74) *Attorney, Agent, or Firm*—King & Spalding L.L.P.

(57) ABSTRACT

The invention relates to an injection valve which has a piezo actuator that is functionally connected to a nozzle needle by a hydraulic transmission device. The hydraulic transmission device is connected to a pressure reservoir by a sealing gap so that the pressure differences between the pressure reservoir and a hydraulic chamber of the hydraulic transmission device are compensated in the long term.

18 Claims, 2 Drawing Sheets

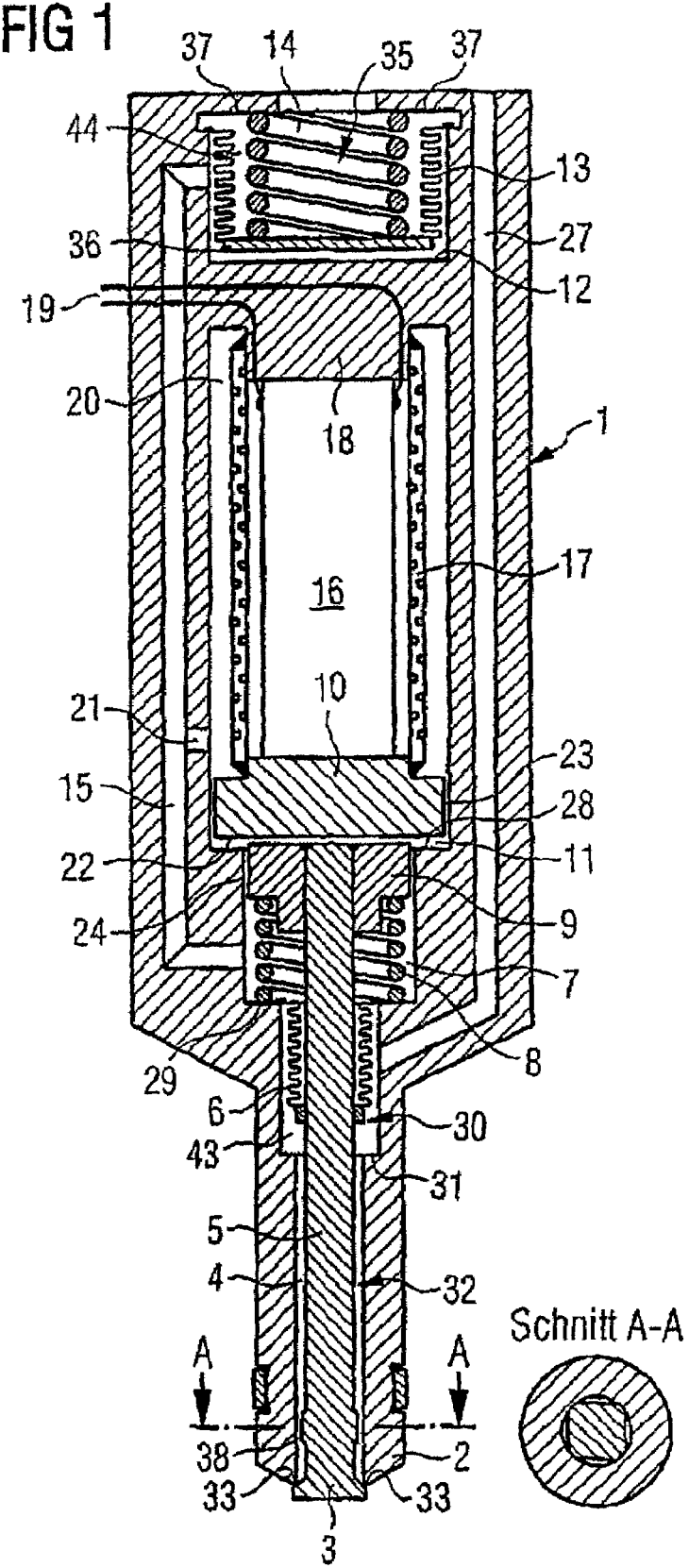

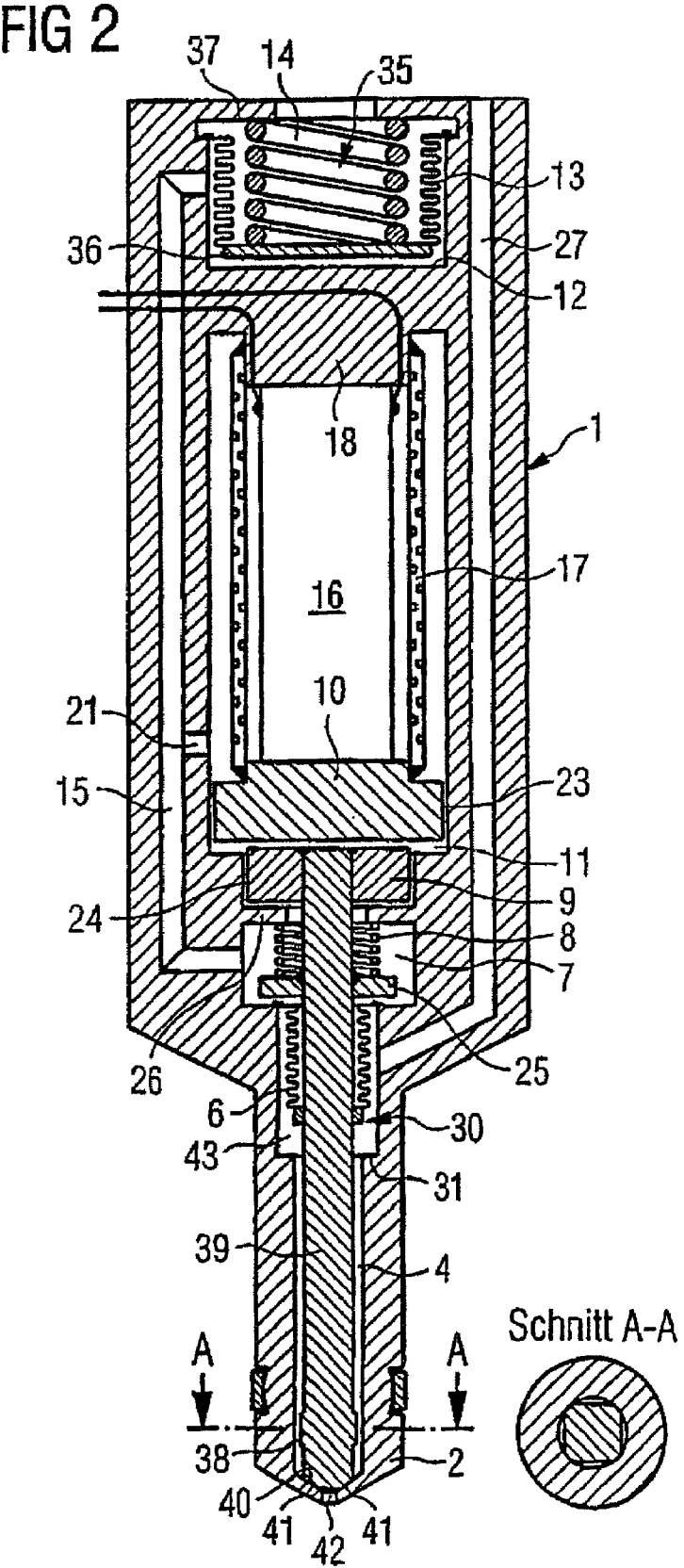

US 7,669,783 B2

METERING VALVE WITH A HYDRAULIC TRANSMISSION ELEMENT

CROSS-REFERENCE TO RELATED APPLICATION

This application is a continuation of co-pending International Application No. PCT/DE01/03042 filed Aug. 9, 2001, which designates the United States, and claims priority to German application number DE10039424.8 filed Aug. 11, 2000.

TECHNICAL FIELD

The invention relates to metering valves.

BACKGROUND OF THE INVENTION

Metering valves are used as injection valves, for example in the case of direct injection of petrol or in the case of direct injection of diesel, in order to supply an internal combustion engine of a motor vehicle with a precisely metered quantity of fuel. In the case of modern injection valves, piezoactuators are used for controlling a nozzle needle. Piezoelectric multilayer actuators which are currently available were developed for the common rail injection system and have high blocking forces of up to 2000 Newton with a small extension of up to 60 μm.

For a direct actuation of the nozzle needle in a petrol injection valve, an adjusting path of up to 100 μm with a correspondingly smaller force is necessary. The piezoactuators which are already available therefore do not correspond.

Furthermore, thermal expansions, aging effects in the piezoceramic and pressure-induced expansions, in particular at small deflections of up to 60 μm, have a negative effect on the correct setting of the nozzle needle.

SUMMARY OF THE INVENTION

The object of the invention is to provide an injection valve which has an improved functioning capability.

The object of the invention is achieved by the following features:

A metering valve having a housing including an activatable actuator, said actuator being functionally connected to an adjusting element, said valve comprising a hydraulic transmission element having a hydraulic chamber positioned between the actuator and the adjusting element, said hydraulic chamber being filled with a fluid wherein a deflection of the actuator is transmitted to the adjusting element via the transmission element, and the hydraulic chamber is connected to a pressurized fluid reservoir via at least one sealing gap.

One advantage of the invention is that a hydraulic transmission device is arranged between the piezoactuator and the nozzle needle, said transmission device being supplied with a fluid at a predetermined pressure via a sealing gap. This ensures that the hydraulic chamber formed in the hydraulic transmission device is always completely filled with fluid, and the piezoactuator is always functionally connected to the nozzle needle via a filled hydraulic chamber. This enables thermal expansions, aging effects and pressure-induced expansions to be compensated.

Further advantageous embodiments are specified in the detailed description below.

BRIEF DESCRIPTION OF THE FIGURES

The invention will be explained in greater detail below with reference to the figures, in which:

FIG. 1 shows an outwardly opening injection valve, and
FIG. 2 shows an inwardly opening injection valve.

DETAILED DESCRIPTION OF THE PREFERRED EMBODIMENTS OF THE INVENTION

FIG. 1 shows a cross section through an injection valve having a housing 1 which has an actuator chamber 20. Arranged in the actuator chamber 20 is the piezoactuator 16 which is fastened at an upper end to a stop plate 18 is formed symmetrically in the center of the housing 1 and projecting into the actuator chamber 20. Fitted at the other end of the piezoactuator 16 is a primary piston 10 to which a lower end of a sleeve-shaped tube spring 17 is fastened. The upper end of the tube spring 17 is fastened to the outer circumference of the stop plate 18. The tube spring 17 is designed in such a manner that the piezoactuator 16 is compressively stressed during the entire operation. At the upper end, the piezoactuator 16 has electrical connections 19 which are led out of the housing 1 and are connected to a control unit (not illustrated). The length of the piezoactuator 16 is set according to known methods by the control unit via the electrical connections 19. The actuator chamber 20 preferably designed in the form of a cylinder and merges via a first step 28 into a first chamber 7 which is formed in the housing 1 symmetrically in the center with respect to the longitudinal axis of the injection valve and has a small diameter than the actuator chamber 20. The first chamber 7 extends in the direction of the nozzle tip 2 and merges via a second step 29 into a second chamber 30 which is preferably of cylindrical design and is arranged symmetrically in the center with respect to the longitudinal axis of the injection valve. The diameter of the second chamber 30 is smaller than the diameter of the first chamber 7.

The second chamber 30 merges via a third step 31 into a third chamber 32. The third chamber 32 is arranged symmetrically in the center with respect to the longitudinal axis of the injection valve and has a smaller cross section than the second chamber 30. The third chamber 32 extends with a constant diameter as far as opening on the nozzle tip 2.

The primary piston 10 is matched in cross section to the actuator chamber 20, with the result that the primary piston 10 is guided in the actuator chamber 20 via a first sealing gap 23. Formed in the first chamber 7 is a secondary piston 9 which is of cylindrical design in cross section and is guided in the first chamber 7 via a second sealing gap 24. A hydraulic chamber 11 which is filled with fluid is formed between the primary piston 10 and the secondary piston 9.

Fastened to the secondary piston 9 symmetrically in the center with respect to the longitudinal axis of the injection valve is a nozzle needle 5 which, as far as the nozzle tip 2, is guided through the first, second and third chamber 7, 30, 32 until it reaches beyond the nozzle tip 2. At the end of the nozzle needle 5, the nozzle needle 5 expands to a widened diameter on which is formed a valve seat 3 which interacts with a seat surface 33 of the nozzle tip 2, which seat surface is formed in the region of the opening of the nozzle tip 2. A first spring element 8, which rests on the second step 29 and is stressed against a step surface 34 of the secondary piston 9, is arranged in the first chamber 7. The first spring element 8 prestresses the secondary piston 9 in the direction of the hydraulic chamber 11. This simultaneously presses the valve seat 3 of the nozzle needle 5 onto the seat surface 33, with the result that the injection space 4, which is bounded in the third chamber 32 by the nozzle needle 5 and the housing 1, is closed.

A first bellows 6, which surrounds the nozzle needle 5 and is welded at a first end in a peripherally sealed manner to the nozzle needle 5, is provided in the region of the second chamber 30. The second end of the first bellows 6 is welded in a peripherally sealed manner to the housing 1 in the region of the second step 29. A part of the second chamber 30, the so called injection region 43, is therefore sealed off from the first chamber 7. An inlet bore 27, which is connected to a fuel reservoir, for example a fuel accumulator, opens into the injection region of the second chamber 30. The injection space 4 is supplied with fuel via the inlet bore 27. The fuel accumulator is supplied with fuel at a predeterminable pressure by a fuel pump.

A fourth chamber 35 is formed in the housing 1 above the piezoactuator 16. The fourth chamber 35 is preferably of cylindrical design and arranged symmetrically in the center with respect to the longitudinal axis of the injection valve. A second bellows 13, which is connected at an upper end in a peripherally sealed manner to the housing 1, is arranged in the fourth chamber 35. The lower end of the second bellows 13 is connected in a peripherally sealed manner to a pressure plate 36. The pressure plate 36 is likewise situated in the fourth chamber 35. The further chamber 35 is thereby divided into a pressure region 44 and into a fluid region 12, the fluid region being formed outside the second bellows 13 and below the pressure plate 36. Provided in the pressure region 44 is a second spring element 14 which is clamped between a third stop 37 in the pressure plate 36. The third step 37 is formed on the housing 1 in the form of an annular surface perpendicular with respect to the longitudinal axis of the injection valve. Instead of the second spring element 14, the second bellows 13 and the pressure plate 36, another pressure-generating means may also be provided which pressurizes the fluid which is adjacent to the first and/or second sealing gap 23, 24. For example, instead of the second spring element 14, a gas pressure source which pressurizes the pressure plate 36 could be provided.

The fourth chamber 35 is connected to a bore 15 which hydraulically connects the fluid region 12 of the fourth chamber 35 to the first chamber 7. A connecting bore 21 which hydraulically connects the first bore 15 to the actuator chamber 20 is preferably also provided. In this manner, the first and second sealing gaps 23, 24 are hydraulically connected to the fluid region of the fourth chamber 35 via the actuator chamber 20, the connecting bore 21 and the first bore 15 or via the first chamber 7 and the first bore 15. This pressure region is sealed with respect to the injection space 4 by the arrangement of the first bellows 1. The pressure-effective surface of the first bellows 6 is preferably dimensioned in such a manner that the nozzle needle 5 is pressure-compensated. For this purpose, the pressure-effective surface of the first bellows is selected to be the same size as the surface which is formed on the valve seat 3, and, when the injection valve is closed, is pressurized in the opening direction of the nozzle needle 5.

The first and the second sealing gap 23, 24 are dimensioned in such a manner that short-term pressure differences between the hydraulic chamber 11 and the actuator chamber 20 or the hydraulic chamber 11 and the first chamber 7 are compensated. In this case, "short-term" periods are understood as being the periods during which activation of the piezoelectric actuator causes a deflection of the actuator and therefore opening of the injection valve.

After the installation of the injection valve the hydraulic chamber 11 is completely filled with fluid. In addition, the first chamber 7, the actuator chamber 20, the bore 15 and the fluid region 12 of the fourth chamber 35 are completely filled with fluid. The prestressing of the second spring element 14 causes the fluid to be at a predeterminable pressure which is, for example, 10 bar.

If, for example, different thermal expansions between the housing and piezoactuator or wear to the nozzle needle 5 of the nozzle tip 2 have or has the effect of increasing the distance between the primary piston and the secondary piston 9, then the pressure which is present causes fluid to be passed via the first and the second sealing gaps 23, 24 into the hydraulic chamber 11.

If the distance between the secondary piston 9 and the primary piston 10 is reduced, then fluid flows out of the hydraulic chamber 11 via the first and second sealing gaps 23, 24. In this case, the pressure plate 16 is moved upward counter to the prestressing force of the second spring element 14 and the fluid region of the fourth chamber 35 is enlarged. This ensures that the hydraulic chamber 11 is always completely filled with fluid and the piezoactuator 16, in the inoperative position, is always functionally connected directly to the nozzle needle 5 via the fluid of the hydraulic chamber 11. The nozzle needle 5 is thus always moved without a time delay when the actuator 16 is deflected.

A different design of the surfaces with which the primary piston 10 and the secondary piston 9 are adjacent to the hydraulic chamber 11 enables a desired transmission ratio to be set with which an elongation of the piezoactuator 16 is transmitted into a corresponding displacement of the nozzle needle 5. The elongation of the piezoactuator 16 is preferably converted into an enlarged adjusting path of the nozzle needle 5 in order to achieve a small elongation of 60 μm for a required opening path of approximately 100 μm for reliable opening of the valve seat 3 of the nozzle needle 5.

The injection valve functions in such a manner that the piezoactuator 16 is activated by the connections 19 and is deflected counter to the prestressing force of the tube spring 17. In the process, the primary piston 10 is pressed in the direction of the secondary piston 9, with the result that the secondary piston 9 is moved downward in the direction of the valve seat 3. The valve seat 3 of the nozzle needle 5 is also lifted off from the associated seat surface 33, with the result that the injection space 4 is opened via an annular surface and fuel is dispensed. Fuel is fed into the injection space 4 again via the inlet bore 27. If the injection is to be ended, then the activating signal of the piezoactuator is stopped, so that the piezoactuator 16 is shortened again to its original length and, in the process, the primary piston 10 is moved away from the secondary piston 9, as a result of which the nozzle needle 5 is moved upward, also assisted by the first spring element 8, so that the valve seat 3 is brought to bear against the seat surface 33 and the injection opening, which is formed between the seat surface 33 and the valve seat 3, is closed.

In a preferred embodiment, the tube spring 17 has recesses, so that the fluid can flow into the interior space of the tube spring 17 and covers the piezoactuator 16. The actuator chamber 20 is preferably completely filled with fluid. This produces a thermal connection between the piezoactuator 16 and the tube spring 17 and the housing 1, thus enabling the piezoactuator 16 to readily dispense heat to the housing 1. The effect achieved by this is cooling of the piezoactuator 16 at a high activating frequency, which is particularly advantageous.

The nozzle needle 5 is guided in the region of the nozzle tip 2 via a guide section 38 on the inner wall of the nozzle tip 2. This guide is illustrated in the section A-A, the rounded square shape of the guide section 38 ensuring that fuel passes from the upper region of the injection space 4 to the valve seat 3.

The first and second bellows 6, 13 are produced from metal and are relatively robust, so that the pressure difference of approximately 300 bar, which occurs between the injection space 4 and the first chamber 7, is withstood without any problems.

FIG. 2 shows a further exemplary embodiment of the invention, the injection valve illustrated in FIG. 2 constituting an inwardly opening injection valve. The injection valve of FIG. 2 is essentially designed corresponding to the injection valve of FIG. 1, but there are differences in the shape of the tip of the second nozzle needle 39 and of the nozzle tip 2 and in the prestressing of the second nozzle needle 39. At its lower end, the second nozzle needle 39 has a second valve seat 14 which is designed at the conical end of the second nozzle needle 39. The second valve seat 40 is assigned a second seat surface 41 which is formed on the inner surface of the nozzle tip 2. The second seat surface 41 is likewise of conical design and has a predetermined differential angle with respect to the conical shape of the second valve seat 40. An injection hole 42, which is separated from the injection space 4 when the second valve seat 40 is seated on the second seat surface 41, is formed centrally in the nozzle tip 2.

Furthermore, a first annular stop 25 is formed on the second nozzle needle 39 in the region of the first chamber 7. In addition, a second annular stop 26 which surrounds the nozzle needle 5 is formed on the housing 1 above the first stop 25. A third spring element 42 is arranged between the first and the second stop 25, 26, said spring element prestressing the nozzle needle 5 in the direction of the nozzle tip 2. The further construction of the second injection valve of FIG. 2 corresponds to the construction of the first injection valve of FIG. 1 and the functioning of the second injection valve corresponds to the functioning of the first injection valve, with the second injection valve opening inward.

The activation of the second injection valve differs from the activation of the first injection valve, since the second injection valve opens inward. In the closed position, in which injection does not take place, the actuator 16 is activated and increased in length, with the second nozzle needle 39 being pressed onto the second seat surface 41 via the hydraulic chamber 11. If an injection is to take place, a corresponding activation is used to shorten the actuator 16 and the second nozzle needle 39 is lifted off from the second valve seat 40 via the hydraulic chamber 11. In order to end the injection the length of the actuator 16 is increased and, as a result, the second nozzle needle 39 is pressed again onto this second seat surface 41. The invention has been described using the example of a nozzle needle 5, 39 as the adjusting element, but any type of adjusting element may be used.

What is claimed is:

1. A metering valve for dispensing a first fluid comprising:
a housing including an piezo actuator;
an adjusting element comprising a nozzle needle fastened to a piston, the adjusting element functionally connected to said actuator;
a transmission element having a hydraulic chamber positioned between the actuator and the adjusting element, wherein an actuator deflection is transmitted to the adjusting element via the transmission element;
a fluid reservoir comprising a second fluid which is sealed off from the first fluid, said fluid reservoir having a predetermined pressure being coupled through a sealing gap with said hydraulic chamber, wherein the fluid reservoir is coupled with means generating a pressure such that the hydraulic chamber is always completely filled with the second fluid and the adjusting element remains functionally connected to said actuator, and
a bellows connected to the nozzle needle and the housing.

2. The valve as claimed in claim 1, wherein the chamber is bounded by a piston.

3. The valve as claimed in claim 2, wherein the actuator is connected to the piston.

4. The valve of claim 3, wherein the piston is located adjacent the chamber.

5. The valve of claim 1, further comprising a nozzle tip, wherein the nozzle tip and needle are designed to form an outwardly opening valve.

6. The valve of claim 1, wherein the bellows is adapted such that the nozzle needle is pressure-compensated.

7. A metering valve for dispensing a first fluid comprising a housing including a controllable actuator,
an adjusting element functionally coupled with said actuator,
a hydraulic transmission element having a hydraulic chamber positioned between the actuator and the adjusting element, wherein when said hydraulic chamber is filled with a second fluid which is sealed off from the first fluid, a deflection of the actuator is transmitted to the adjusting element via the hydraulic transmission element, and
a fluid reservoir for providing the second fluid having a predetermined pressure being coupled through at least one sealing gap with said hydraulic chamber, wherein the fluid reservoir is coupled with means generating a pressure such that the hydraulic chamber is always completely filled with the second fluid and the adjusting element remains functionally coupled with said actuator wherein the hydraulic chamber is bounded by a piston guided movably in a first chamber via the sealing gap, and the first chamber is connected to the reservoir via the sealing gap,
wherein the adjusting element comprises a nozzle needle and is fastened to the piston and is guided through the first chamber and through an injection space to a nozzle tip, and a bellows is connected in a peripherally sealed manner to the nozzle needle and to the housing, wherein at least one region of the first chamber is hydraulically separated from the injection space.

8. The metering valve as claimed in claim 7, wherein the nozzle needle and the nozzle tip are designed in the form of an outwardly opening valve, and a spring element is provided to prestress the nozzle needle inward in the direction of a seat surface.

9. The metering valve as claimed in claim 8, wherein the spring element is arranged in the first chamber.

10. The metering valve as claimed in claim 7, wherein the bellows is adapted such that the nozzle needle is pressure-compensated.

11. The metering valve of claim 7, wherein the adjusting element comprises a nozzle needle.

12. A metering valve for dispensing a first fluid comprising a housing including a controllable actuator,
an adjusting element functionally coupled with said actuator,
a hydraulic transmission element having a hydraulic chamber positioned between the actuator and the adjusting element, wherein when said hydraulic chamber is filled with a second fluid which is sealed off from the first fluid, a deflection of the actuator is transmitted to the adjusting element via the hydraulic transmission element, and a fluid reservoir for providing the second fluid having a predetermined pressure being coupled through at least one sealing gap with said hydraulic chamber, wherein the fluid reservoir is coupled with means generating a pressure such that the hydraulic chamber is always completely filled with the second fluid and the adjusting element remains functionally coupled with said actuator, wherein the actuator is functionally connected to a piston located adjacent the hydraulic chamber and, wherein the piston is guided movably via a second sealing gap and an actuator chamber is connected to the reservoir via the second sealing gap, wherein the adjusting element comprises a nozzle needle and is fastened to the piston and is guided through the first chamber and through an injection space to a nozzle tip, and a bellows is connected in a peripherally sealed manner to the nozzle needle and to the housing, wherein at least one region of the first chamber is hydraulically separated from the injection space.

13. The metering valve as claimed in claim 12, wherein the nozzle needle and the nozzle tip are designed in the form of an outwardly opening valve, and a spring element is provided to prestress the nozzle needle inward in the direction of a seat surface.

14. A metering valve for dispensing a first fluid comprising a housing including a controllable actuator, an adjusting element functionally coupled with said actuator, a hydraulic transmission element having a hydraulic chamber positioned between the actuator and the adjusting element, wherein when said hydraulic chamber is filled with a second fluid which is sealed off from the first fluid, a deflection of the actuator is transmitted to the adjusting element via the hydraulic transmission element, and a fluid reservoir for providing the second fluid having a predetermined pressure being coupled through at least one sealing gap with said hydraulic chamber, wherein the fluid reservoir is coupled with means generating a pressure such that the hydraulic chamber is always completely filled with the second fluid and the adjusting element remains functionally coupled with said actuator, wherein the hydraulic chamber is bounded by a primary piston guided movably in a first chamber via the sealing gap, and the first chamber is connected to the reservoir, and the adjusting element comprises a nozzle needle and is fastened to a secondary piston and is guided through the first chamber and through an injection space to a nozzle tip, and a bellows is connected in a peripherally sealed manner to the nozzle needle and to the housing, wherein at least one region of the first chamber is hydraulically separated from the injection space.

15. The metering valve as claimed in claim 14, wherein the actuator is functionally connected to the primary piston located adjacent the hydraulic chamber and, via a second sealing gap guided movably in an actuator chamber connected to the reservoir.

16. The metering valve as claimed in claim 14, wherein the nozzle needle and the nozzle tip are designed in the form of an outwardly opening valve, and a spring element is provided to prestress the nozzle needle inward in the direction of a seat surface.

17. The metering valve as claimed in claim 16, wherein the spring element is arranged in the first chamber.

18. The metering valve as claimed in claim 14, wherein the bellows is adapted such that the nozzle needle is pressure-compensated.

* * * * *